United States Patent
Helaine et al.

(10) Patent No.: US 8,495,173 B2
(45) Date of Patent: Jul. 23, 2013

(54) MOBILE RADIO COMMUNICATION DEVICE AND METHOD OF MANAGING CONNECTIVITY STATUS FOR THE SAME

(75) Inventors: Hubert Helaine, Andresy (FR); Cecile Helaine, legal representative, Andresy (FR); Fabrice Zappulla, Eaubonne (FR)

(73) Assignee: NEC Corporation, Tokyo (JP)

( * ) Notice: Subject to any disclaimer, the term of this patent is extended or adjusted under 35 U.S.C. 154(b) by 852 days.

(21) Appl. No.: 12/066,802

(22) PCT Filed: Sep. 25, 2006

(86) PCT No.: PCT/JP2006/319003
§ 371 (c)(1),
(2), (4) Date: Jan. 14, 2010

(87) PCT Pub. No.: WO2007/034954
PCT Pub. Date: Mar. 29, 2007

(65) Prior Publication Data
US 2010/0146075 A1 Jun. 10, 2010

(30) Foreign Application Priority Data
Sep. 26, 2005 (GB) .................................. 0519573.0

(51) Int. Cl.
*G06F 13/00* (2006.01)
(52) U.S. Cl.
USPC ........................................................ 709/219
(58) Field of Classification Search
USPC ........................................................ 709/219
See application file for complete search history.

(56) References Cited

U.S. PATENT DOCUMENTS

| | | | |
|---|---|---|---|
| 6,944,650 | B1 | 9/2005 | Urien |
| 2001/0005859 | A1 | 6/2001 | Okuyama et al. |
| 2005/0259673 | A1* | 11/2005 | Lu et al. ........................ 370/419 |
| 2006/0079284 | A1* | 4/2006 | Lu et al. ........................ 455/558 |
| 2006/0291502 | A1* | 12/2006 | Kalofonos .................... 370/466 |

FOREIGN PATENT DOCUMENTS

| | | |
|---|---|---|
| JP | 200059422 A | 2/2000 |
| JP | 2000134260 A | 5/2000 |
| JP | 2001-77878 A | 3/2001 |
| JP | 2002152835 A | 5/2002 |
| JP | 2004266665 A | 9/2004 |
| JP | 2004-328130 A | 11/2004 |
| JP | 2004-343619 A | 12/2004 |
| JP | 2004-343783 A | 12/2004 |

OTHER PUBLICATIONS

"Smart cards; Transport protocol for CAT applications; Stage 2 (Release 6); ETSI TS 102 127", ETSI Standards, May 2005, XP014030439.

(Continued)

*Primary Examiner* — Wing F Chan
*Assistant Examiner* — David X Yi
(74) *Attorney, Agent, or Firm* — Sughrue Mion, PLLC

(57) ABSTRACT

The present invention provides a method of managing connection status for a channel connecting a server device to a mobile radio communication device including a client/server pair, the method including upon receiving an indication that the client/server pair is disconnected, sending from the mobile radio communication device a status signal to the server device indicating that the client has reset connection between the client/server pair, and upon receiving an indication that the client has connected to the server device, sending from the mobile radio communication device a status signal to the server device indicating that the client is connected to the server device.

16 Claims, 5 Drawing Sheets

OTHER PUBLICATIONS

"Smart cards; Card Application Toolkit (CAT) (Release 6); ETSI TS 102 223", ETSI Standards, May 2005, XP014030447.

Extended European Search Report dated Aug. 30, 2011 from the European Patent Office in counterpart European Patent Application No. 06810528.7.

Notice of Reasons for Rejection dated Jan. 10, 2012 issued by the Japanese Patent Office in counterpart Japanese Patent Application No. 2007-536589.

Office Action dated Feb. 8, 2013 issued by the European Patent Office in counterpart European Application No. 06810528.7.

"Smartcard Web Server Architecture; OMA-AD-Smartcard_Web_Server-v1_0-20050927-D", Open Mobile Alliance (OMA), Aug. 22, 2005, XP064021902.

* cited by examiner

MOBILE RADIO COMMUNICATION DEVICE AND METHOD OF MANAGING CONNECTIVITY STATUS FOR THE SAME

BACKGROUND OF THE INVENTION

1. Field of the Invention

The invention relates to a mobile radio communication device, and a method of managing connectivity status for the same.

2. Description of the Related Art

The increased functionality offered by a mobile radio communication device such as a cellular phone handset has arisen from technical developments relating to the various circuit elements of the cellular phone handset, the operating and application software and also from improvements relating to network operation and characteristics.

One recent development has focused on the Subscriber Identification Module (SIM) card employed within a mobile phone handset and, in particular, relates to the adoption of internet-related technology within a SIM card device.

One such development relates to the provision of a web server running in a subscriber identification module card, which allows for the provision of SIM-based services whilst taking advantage of the multimedia capability already present in the mobile phone handset and relating, for example, to data display and/or information processing.

That is, the provision of such a smartcard web server allows for internet-related design characteristics to be incorporated into SIM card applications, and this can lead to advantages such as enhanced and unified graphical user interface (GUI) for SIM-based services, the storage of static pages such as a browser's homepage, and also the use of dynamic web pages.

Such pages can prove attractive to network operators as a means for increasing on-line revenue.

Further, control of a SIM-based services menu can readily be profiled so as to match the end-user's preferences and common requirements.

Connectivity with the mobile phone handset to the smartcard web server is achieved by way of a Bearer Independent Protocol (BIP) channel, and so use of such a BIP server allows support within the mobile phone handset of the local smartcard web server which is then readily accessible by the handset browser.

However, limitations are nevertheless experienced concerning the manner in which channel status signals are developed and employed within the mobile phone handset particularly with regard to connectivity to the smartcard web server and to a related transport connection protocol (TCP) client/server pair.

As discussed further below with regard to limitations found in the related art, it is found that the mobile phone handset can disadvantageously lose local connection within the TCP client/server pair within the mobile phone handset, and then, the browser associated with the smartcard web server will then make an attempt at reconnection. The data exchanges that arise in relation to such reconnection will lead to a decrease in the speed of operational processing within the mobile phone handset.

Further, it can disadvantageously be found that limitations arise with regard to the manner in which indications can be provided to the smartcard we server device that the server of the TCP client/server pair is ready for re-connection and, in order to ensure successful further connection, the smartcard web server will server to close, and then, re-open the channel. Such attempted re-connection, and associated closing and re-opening of the channel will likewise lead to an increase in message being generated, and this is found to have a disadvantageous effect of slowing down the data exchange in the mobile phone handset.

In general, current systems are disadvantageously limited since, for client mode operation, there is generally only provided an arrangement for indicating the status of the bearer connection by means of "line dropped with packet connection activated" status signals or "line dropped with packet connection deactivated" status signals.

FIGS. 1, 2 and 3 are timing charts showing channel status found in the related mobile radio communication device.

Hereinbelow is explained the problem found in the related mobile radio communication device, with reference to FIGS. 1 to 3.

FIG. 1 is a timing chart illustrating channel status events with regard to status transmissions within a mobile radio communication device handset and between a network connection 10, a browser 12, a TCP/IP client 14, a TCP/IP server 16, USAT 18, USIMM 20, and a web server circuit card 22 in the form of a Universal Mobile Telecommunications System Integrated Circuit Card (UICC).

As noted above, in accordance with current IP specifications for operation in client mode, there is only one manner in which status of the bearer connection is provided by way of "line dropped with packet connection activated" and "line dropped with packet connection deactivated" status signals.

As illustrated in FIG. 1, with a normal service signal 24 originating from the network 10, channel status signals 26 are provided from SAT 18 and USIMM 20, confirming packet connection activated and link established.

Then, the mobile radio communication device is in a mode waiting for receipt of a new network status, as indicated by an arrow 28.

When a new network status, for example "no service" is received from the network, as indicated by an arrow 30, the channel status 32 to the circuit card 22 is changed as indicated to packet connection activated and line dropped.

It should however be appreciated that, the "no service" signal can arise through the mobile phone handset being out-zone temporarily, but with its packet connection context, not deactivated by the network 10. This leads to the "line dropped with packet connection activated" or "line dropped" status signal 32.

The mobile radio communication device is then again waiting for a new network status such as indicated by an arrow 34.

On receipt of a new network status, such as "service detached" as indicated by an arrow 36 from the network 10, the packet connection context is then deactivated by the network 10, and the data link is downed. This leads to the channel status signal 38 indicating "packet connection deactivated" or "line not established".

It should be however be appreciated that the above-mentioned channel status signals are used primarily in order to indicate the network status, i.e., the incoming signals arising from the network source 10, and are not employed for describing the TCP client/server pair status connection.

The TCP client/server pair status connection can comprise various status such as "listening", "listening and connected", "listening and disconnected", and, again "listening".

When listening, the TCP/IP server 16 is waiting for connection from a remote client, and the status "listening and connected" arises when connection from a remote client to the TCP/IP server 16 is achieved for subsequent data exchange.

Once the remote client disconnects this connection to the TCP/IP server 16, the shutdown status is sent to the TCP/IP server 16, leading to the "listening and disconnected" status.

As noted above, various limitations and related problems can arise from the above-mentioned channel status management.

For example, with regard to the bearer connection channel status signals currently arising, i.e. "link established or packet connection activated" or "link not established or packet connection not activated", the subscriber identification module card (smartcard) web server is enable to determine if a client is connected or not, as indicated by the "link established" and "link not established" status signals.

Furthermore, in this scenario, it will not be possible for the subscriber identification module card (smartcard) web server to determine the difference between a client connection status signal and a network change status signal.

Thus, if the network 10 sends a change status signal to the mobile radio communication device, a revised channel status signal will be sent to the web server circuit card 22.

For example, if a "SERVICE_DETACHED" status signal is received from the network 10, the mobile radio communication device then will send a "link not established" signal as indicated in FIG. 1 such that the web server circuit card 22 will then proceed to send a close channel status signal. This close channel status signal will serve to reset the local connection with the client.

Such operation proves particularly disadvantageous in that the user will then lose its local connection temporarily, and the browser 12 will attempt a re-connection and the data exchanges arising in relation to such attempted re-connection. This will lead to a decrease in possible speed for the data exchanges within the mobile radio communication device.

Such problematic operation within the current state of the art is illustrated with reference to FIG. 2.

FIG. 2 is a timing diagram showing status signals arising within a network connected mobile radio communication device, and illustrating the network connection 40, the browser 42, the TCP/IP client 44, the TCP/IP server 46, the BIP/SATS 48, and the web server circuit card 50.

The channel status indicated by the web server circuit card 50 is initially an OPEN_CHANNEL status indicated by an arrow 52, which arises with an automatic re-connection flag off.

To initiate activity, the browser 42 sends a first request as indicated by an arrow 54, but, prior to this, the BIP channel status is indicated by an arrow 56 as "link not established".

This TCP connection status as sent to the web server circuit card 50 then changes to "link established" as indicated by an arrow 58 upon connection 60 being achieved between the TCP/IP client 44 and the TCP/IP server 46.

The browser 42 and the web server client card 50 are then able to exchange data, as indicated at block 62, prior to receipt of a "service detached" status signal 64 received from the network 40. In this scenario, the network 40 releases the packet connection during data exchanges between the web server circuit card 50 and the browser 42.

A CLOSE_CHANNEL status signal 66 is then generated and issued by the web server circuit card 50 in response to the web server circuit card 50 receiving a "link not established" status signal on its BIP channel.

Disconnection 68 between the TCP/IP client 44 and the TCP/IP sever 46 then arises such that the close channel status signal 66 transmitted from the web server circuit card 50 leads to the browser 42 losing connection to the web server circuit card 50.

Subsequent to the disconnection 68 between the TCP/IP client 44 and the TCP/IP server 46, the channel status signal delivered to the web server circuit card 50 remains as "link not established".

As noted above, such loss of connection and attempted re-connection in the browser 42 leads to a disadvantageous decrease in the rate of data exchanges within the mobile radio communication device.

FIG. 3 is a timing diagram illustrating channel status signals arising within a mobile radio communication device according to the current art, and illustrating standard TCP connection with channel status events arising without network interaction.

FIG. 3 illustrates in particular a further problem arising in the current art in that there is no manner for indicating to the web server circuit card 50 that the TCP/IP server is ready to receive a further connection consistent with the previous connection.

Accordingly, in order to ensure operational connectivity, the web server circuit card 50 has to operate to close, and then, re-open the BIP channel in spite of presence of the automatic re-connection flag.

In view of such operation, the number of messages arising within the mobile radio communication device channel will increase and serve to slow down the general data change within the mobile radio communication device such that normal service from the mobile radio communication device will be unavailable temporarily, i.e. during the close/open phase of operation initiated by the web server smart card.

FIG. 3 illustrates the network 40, the browser 42, the TCP/IP client 44, the TCP/IP server 46, a BIP/SA 48, and the web server circuit card 50.

An OPEN_CHANNEL status signal 52 is provided from the web server circuit card 50, arising with the automatic re-connection flag set.

In this scenario illustrated in FIG. 3, no status signals are transmitted from the network connector 40, and the process proceeds to the browser 42 sending a first request, as indicated by an arrow 54.

Prior to sending such a first request, a channel status signal "link not established" is sent from the TCP/IP server 46 to the web server circuit card 50, as illustrated by an arrow 56.

An event is changed to the channel status to "link established", as indicated by an arrow 58, and subsequent to connection 60 is established between the TCP/IP client 44 and the TCP/IP server 46.

The subsequent to the connection 60 and at the time of establishing the channel status 58, the TCP connection status signal is sent to the web server circuit card 50, but there is no information concerning the server status, in particular, whether the TCP/IP server 46 might be considered to be listening on the channel.

Subsequent to the link being established, the browser 42 and the web server circuit card 50 exchange data as required, as indicated by block 62.

As will be appreciated, the channel status and connection modes discussed above in relation to FIG. 3 are consistent with those arising initially in relation to FIG. 2.

However, in FIG. 3, subsequent to the exchange of data between the browser 42 and the web server circuit card 50, a connection cut is experienced between the TCP/IP client 44 and the TCP/IP server 46, as indicated by an arrow 72, and this leads to a change in channel status to "link not established", as indicated by an arrow 74.

A signal indicative of the connection cut 72 may be sent while a receiver buffer is empty and not during or before a transmission so as to simplify the web server circuit card 50.

Assuming the second request 76 leads to a successful connection, as indicated by an arrow 78, the TCP/IP server 46 initiates the change in connection status to the web server circuit card 50 such that the channel status to the web server circuit card 50 is changed to "link established", as indicated by an arrow 80.

With the link now established, the browser 42 and the web server circuit card 50 initiate a new data exchange, as indicated by block 82.

The closing of the channel status 74, the subsequent second request 76 sent by the browser 42, the attempted further connection 78, and status change 80 will result in a large number of messages which grow to disadvantageously slow down data exchange between the browser 42 and the web server circuit card 50.

SUMMARY OF THE INVENTION

In view of the above-mentioned problems in the current art, it is an object of the present invention to provide a method of managing connectivity status in a mobile radio communication device, and a mobile radio communication device capable of managing connectivity status thereof, both of which are able to solve the problems in the current art.

In a first exemplary aspect of the present invention, there is provided a method of managing connection status for a server device within a mobile radio communications device, the mobile radio communications device including a local client/server pair, the method including the steps of receiving an indication of a change of connection status for a local client/server pair or an indication of a change of network status, processing the received indication to discriminate between the change of connection status and the change of network status, generating, in response to the processing, a client/server status signal when a change of connection status for the local client/server pair occurs and a different status signal when a change of network status occurs, and sending the generated status signal to the server device.

In a second exemplary aspect of the present invention, there is provided a mobile radio communications device for communicating with a network, the device including: a local client/server pair; and a device for managing a connection status of a server device for a channel between the server device and the local client/server pair, wherein the managing device is configured for receiving an indication of a change of connection status for a local client/server pair or an indication of a change of network status, processing the received indication to discriminate between the change of connection status and the change of network status, generating, in response to the processing, a client/server status signal when a change of connection status for the local client/server pair occurs and a different status signal when a change of network status occurs, and sending the generated status signal to the server device.

In a third exemplary aspect of the present invention, there is provided a server device for use with a mobile radio communications device, the server device including a first device for establishing a channel with a local client/server pair of the mobile radio communications device, a second device for receiving a client/server status signal from the mobile radio communications device when a change of connection status for the local client/server pair occurs and for receiving a different status signal from the mobile radio communications device when a change of network status occurs, a third device for processing the received status signal to discriminate between the client/server status signal and the different status signal, and a fourth device for maintaining the channel when the client/server status signal is received.

In a fourth exemplary aspect of the present invention, there is provided a method performed in a server device for managing communication with a mobile radio communications device, the method including the steps of establishing a channel with a local client/server pair of the mobile radio communications device, receiving a status signal from the mobile radio communications device wherein the status signal is a client/server status signal generated in response to a change in client/server status or a different status signal generated in response to a change in network status, processing the received status signal to discriminate between the client/server status signal and the different status signal, and maintaining the channel when the processing indicates a client/server status signal is received.

In a fifth exemplary aspect of the present invention, there is provided a method of managing connection status for a channel connecting a server device within a mobile radio communications device, the mobile radio communications device including a local client/server pair, the method including steps of upon receiving an indication that the client/server pair is disconnected, sending from the mobile radio communications device a status signal to the server device indicating that the client has reset connection between the client/server pair, and upon receiving an indication that the client has connected to the server, sending from the mobile radio communications device a status signal to the server device indicating that the client is connected to the server.

In a sixth exemplary aspect of the present invention, there is provided a mobile radio communications device having a server device and channel for connection of the server device therein, the mobile radio communications device including a local TCP client/server pair, and arranged for, upon receiving indication that the client/server pair is disconnected, sending a status signal indicating to the server device that the client has reset connection between the client server pair, and the mobile radio communications device being arranged such that, upon receiving an indication that the client is connected to the server, sending a status signal to the server device indicating that the client is connected to the server.

Advantageously, the mobile radio communication device is arranged for providing further channel status signals and signals indicative of details as outlined above.

Thus, it will be appreciated that the present invention allows for dividing the semantic reporting between the bearer connection status and the transport connection status of the TCP connection. This is particularly useful when a client of the server device comprises a remote client.

The above and other objects and advantageous features of the present invention will be made apparent from the following description made with reference to the accompanying drawings, in which like reference characters designate the same or similar parts throughout the drawings.

Figure 1:
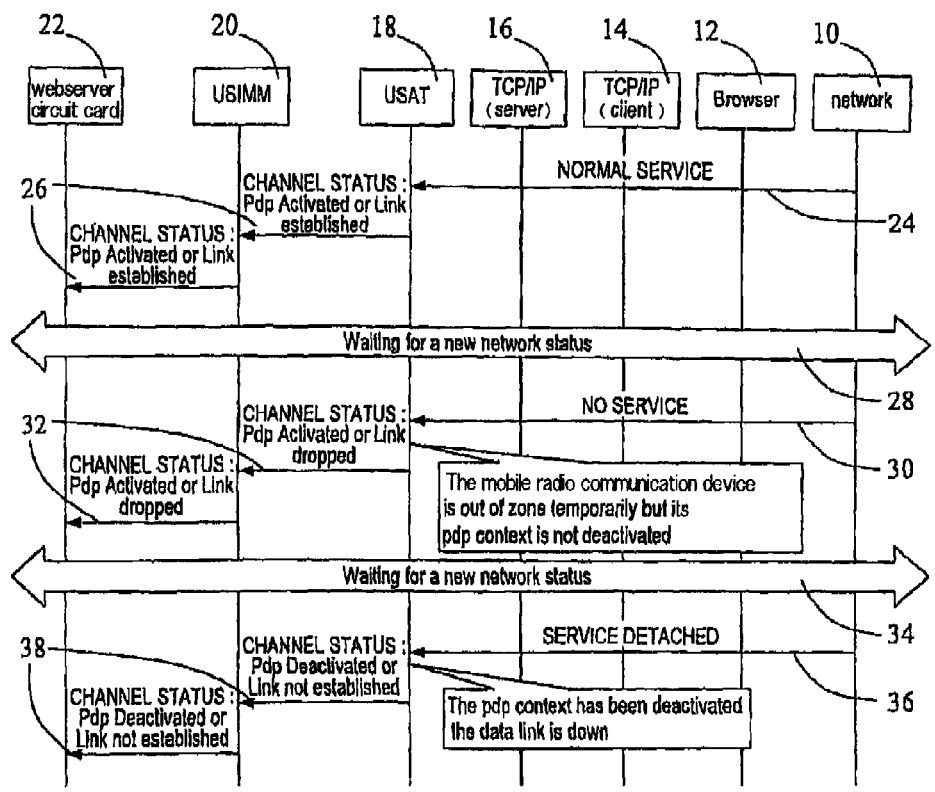
FIG. 1 is a timing diagram showing channel status events arising in a mobile radio communication device in accordance with the current state of the art.

DESCRIPTION OF THE EXEMPLARY
EMBODIMENTS

In accordance with the present invention, in order to avoid any confusion between the mobile radio communication device and the web server circuit card 50, specific channel status signals are generated in order to indicate the accurate TCP server status to the web server circuit card 50.

A "link not established" status signal was transmitted to the web server circuit card 50 when the local client disconnects in the current state of the art. In accordance with the present invention, the mobile radio communication device can be arranged to send a "disconnection" status signal to the web server circuit card 50 in place of sending a "link not established" status signal.

Furthermore, instead of sending a "link established" status to the web server circuit card 50 when the local client connects to the server, the mobile radio communication device may be arranged to send a "in connection" status signal to the web server circuit card 50.

Furthermore, the mobile radio communication device, when arranged to listen on a specified port of the web server circuit card 50, can be arranged to send a "listening" status signal to the web server circuit card 50.

The present invention is advantageous in providing improved operation and management of the channels in the mobile radio communication device as compared with the current state of the art.

For example, the web server circuit card 50 when arranged for operation in accordance with the present invention will be able to discriminate between a network event and a TCP client/server connection event.

Furthermore, the smartcard web server circuit card 50 can be accessed from a location remote from the mobile radio communication device, and can provide a specific local address.

The data exchanges between the mobile radio communication device and the web server circuit card 50 can be improved. A "listening" status signal is generated and received for each of the web server circuit card 50 between subsequent TCP client connections. The web server circuit card 50 will not then need to initiate a close/open channel procedure in order to ensure the current state of TCP server connectivity.

Through adoption of the three new channel status events noted above, i.e. "connected", "disconnected" and "listening", the following five channel status events can be implemented in accordance with the present invention.

A "listening" status event indicates that the server is waiting from a connection from a remote client, whereas a "connected" status event indicates that a client is connected to the server. For instance, this is indicated by an open channel without an automatic re-connection flag.

The "disconnected" status indicates that the client has reset the connection. This is indicated by, for instance, an open channel without the automatic re-connection flag.

Through a combination of the above-mentioned three new channel status events, there can be provided a "connected and listening" channel status which indicates that the client is connected to the server and that the server is ready for the follow-up connection with a status of open channel with an automatic re-connection flag.

Likewise, as combination of the above-mentioned three new channel status events, there can be provided a "disconnected and listening" channel status which indicates that the client has reset the connection with the server and that the server is immediately ready for the next attempted connection. This is as associated with an open channel with an automatic re-connection flag, for instance.

The adoption of the "connected and listening" and "disconnected and listening" status will reduce the number of events sent to the web server circuit card 50 since, without such combining, the mobile radio communication device would send consecutive "connected" and "listening" channel signals to the web server circuit card 50.

An exemplary embodiment in accordance with the present invention is explained hereinbelow with reference to FIGS. 4 and 5.

Figure 4:
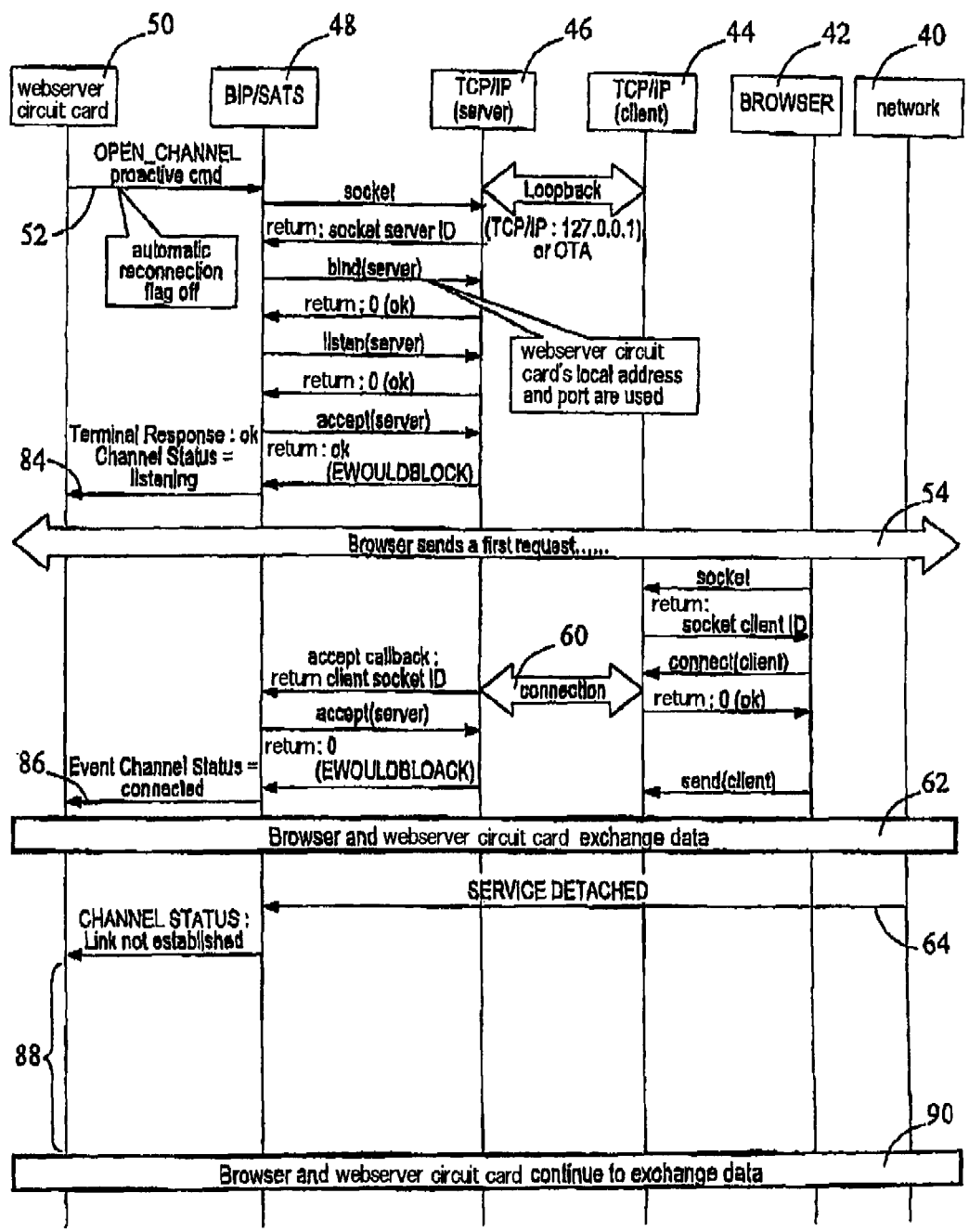
FIG. 4 is a timing diagram illustrating channel status signals arising in a mobile radio communication device in accordance with the exemplary embodiment of the present invention.

FIG. 4 is a timing diagram with channel status events arising in a mobile radio communication device in accordance with the exemplary embodiment of the present invention.

Figure 2:
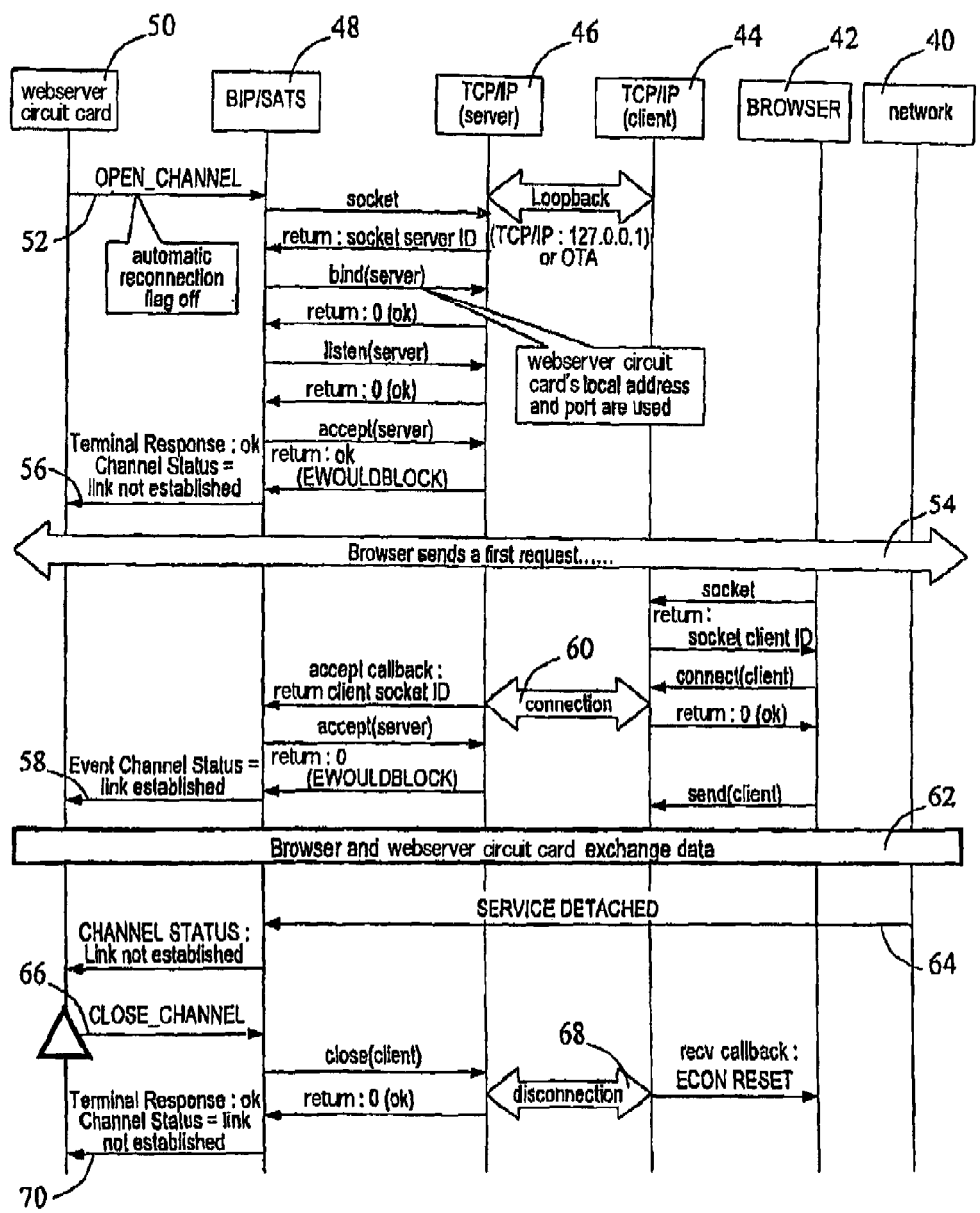
FIG. 2 is a timing diagram showing channel status signals arising in a mobile radio communication device in accordance with the current state of the art.

In particular, FIG. 4 serves to illustrate how the problems illustrated in the timing diagram of FIG. 2 can be overcome by the present invention.

Where appropriate similar reference numbers to those employed in FIG. 2 are found in FIG. 4, and serve to indicate again in FIG. 4 the signaling relationship between the network connector 40, the browser 42, the TCP/IP server 46, the TCP/IP client 44, the BIP/SATS 48, and the web server circuit card 50.

Likewise, similar channel status events, requests 52 and 54, connectivity, and data exchanges 60, 62 and 64 as found in FIG. 2 are likewise illustrated in FIG. 4.

However, the present invention illustrated in FIG. 4 is different in operation from the current state of the art in that the two altered channel status signals "listening" 84 and "connected" 86 arise prior to the browser 42 sending a first request 54, the initial connection 60 between the TCP/IP client 44 and the TCP/IP server 46, and the data exchange 62 between the browser 42 and the web server circuit card 50.

The TCP connection status signal as indicated by arrows 84 and 86 is sent to the web server circuit card 50.

Subsequent to the data exchange 62 between the browser 42 and the web server circuit card 50, the "service detached" status signal 64 again arises as initiated from the network connection 40 since, in this scenario, the network 40 releases the packet connection context during the data exchange 62 between the browser 42 and the web server circuit card 50.

With the change in the channel status signals 84 and 86, the web server circuit card 50 is then not influenced by the SERVICE DETACHED network-originating signal 64, and the web server circuit card 50, as indicated at 88, does not serve to close the BIP channel.

The browser 42 and the web server circuit card 50 can then continue to exchange data as indicated by block 90, and thus, the disadvantages arising in the current state of the art and as illustrated in FIG. 2 do not arise in the present invention.

Figure 3:
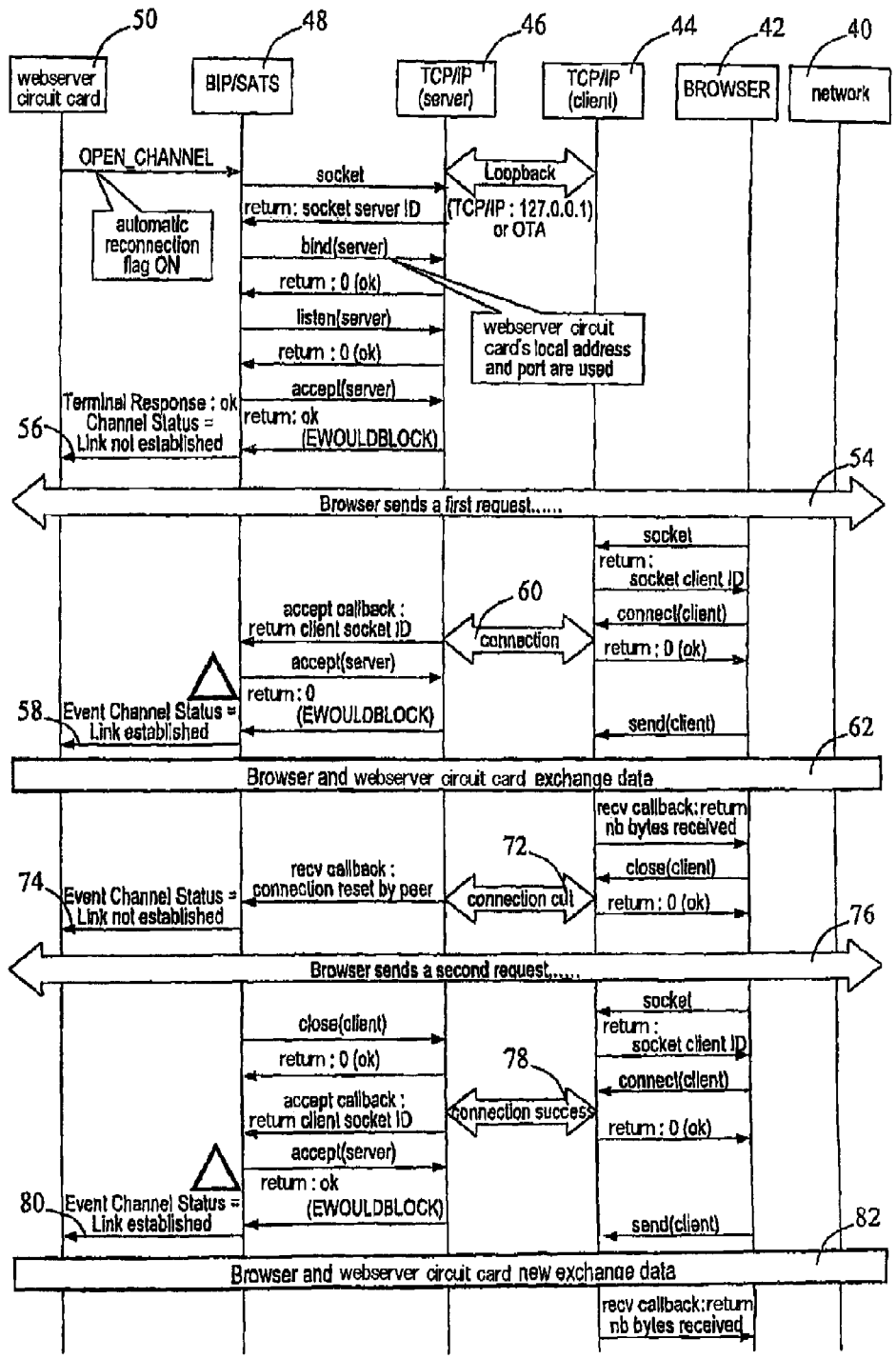
FIG. 3 is a timing diagram showing channel status signals arising in a mobile radio communication device in accordance with the current state of the art.
Figure 5:
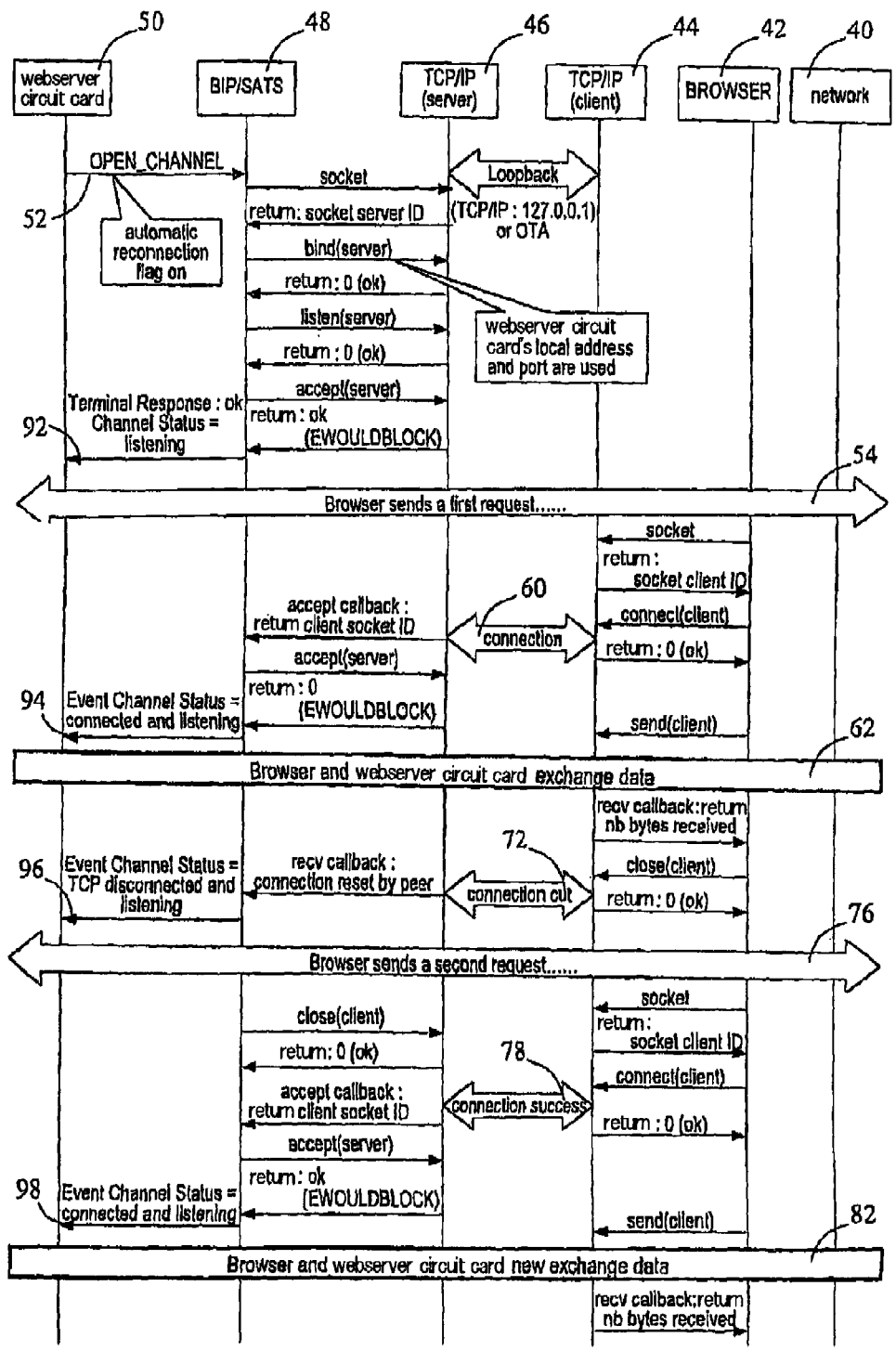
FIG. 5 is a timing diagram illustrating channel status signals arising in a mobile radio communication device in accordance with the exemplary embodiment of the present invention.

FIG. 5 is a timing diagram of a mobile radio communication device in accordance with the exemplary embodiment of the present invention, and illustrates the manner in which the present invention can overcome the problems of the current art as illustrated in FIG. 3.

The reference numerals shown in FIG. 3 are used also in FIG. 5. The network 40, the browser 42, the TCP/IP server 46, the TCP/IP client 44, the BIP/SATS 48, and the web server circuit card 50, and similar channel status and connectivity 52, 54, 60, 62, 72, 76, 78 and 82 as illustrated in FIG. 3 arise in FIG. 5.

However, in accordance with the present invention, the different channel status signals arising in relation to the BIP channel status lead to solution to the problems in the current state of the art.

That is, prior to the browser 42 sending a first request 54, a channel status "listening" signal 92 is delivered to the web server circuit card 50 from the BIP/SATS 48.

Subsequent to the connectivity 60 achieved after the browser 42 has sent its first request 54, and prior to the data exchange 62 arising between the browser 42 and the web server circuit card 50, the channel status is switched to "connected and listening" in accordance with the present invention.

Subsequent to the connection cut 72 between the TCP/IP client 44 and the TCP/IP server 46, the BIP channel status becomes "disconnected and listening" as illustrated by an arrow 96. It should be appreciated that a signal indicative of the connection cut 72 may be sent when the receiver buffer is emptied and not during or before data transport in order to simplify the web server circuit card 50.

Subsequent to the successful connection 78, the channel status changes to "connected and listening" as indicated by an arrow 98, and subsequently the browser 42 and the smartcard web server can then exchange new data as indicated by block 82.

As with FIG. 3, there is no interaction from the network 40 in FIG. 5.

The TCP server status can then be readily determined such that it becomes readily possible to indicate to the web server circuit card 50 that the TCP server is ready to achieve further connectivity.

Additional messages such as those arising in the current state of the art, as illustrated in FIG. 3, do not then arise in the scenario as illustrated in FIG. 5 so as to lead to advantageous improvements within the present invention.

The present invention provides for improved management of a BIP channel connection status when in server mode, and serves to divide the semantic report in between the bearer connection status and the transport connection status of the TCP connection. This proves particular useful in that the client of the web server card comprises a remote client.

However, even with a local client, the management of the connection status for the BIP channel between, for example, a mobile radio communication device and a UICC smartcard when in server mode is advantageously improved.

It should be appreciated in general that the present invention is not restricted to the details of the above-mentioned exemplary embodiments. For example, the present invention not only relates to local TCP connection, but is also equally relevant to remote connection. For example, if an IP address of a mobile radio communication device is known to a user, the user can then connect to the web server through his/her own browser.

Apart from the above-mentioned exemplary embodiments, the method of managing connection status for a server device within a mobile radio communications device, the mobile radio communications device for communicating with a network, the server device for use with a mobile radio communications device, and the method performed in a server device for managing communication with a mobile radio communications device, all in accordance with the present invention has preferred exemplary embodiments as follows.

In an exemplary embodiment of the method of managing connection status for a server device within a mobile radio communications device, it is preferable that, when an indication of a change of connection status for the local client/server pair is received, the processing step determines the nature of the change, and the generation step generates a corresponding client/server status signal in dependence on a result of the determination.

In an exemplary embodiment of the method of managing connection status for a server device within a mobile radio communications device, it is preferable that when the change in connection status is a change to a state in which the server is ready for a connection from a remote client, a client/server status signal is generated which indicates that the server is waiting for a connection.

In an exemplary embodiment of the method of managing connection status for a server device within a mobile radio communications device, it is preferable that the client/server status signal indicating the server is waiting for a connection is generated prior to the remote client sending a request.

In an exemplary embodiment of the method of managing connection status for a server device within a mobile radio communications device, it is preferable that when the change in connection status is a change to a connected state, a client/server status signal is generated which indicates that the client/server pair is connected.

In an exemplary embodiment of the method of managing connection status for a server device within a mobile radio communications device, it is preferable that the client/server status signal indicating the client/server pair is connected is generated after a remote client sends a request.

In an exemplary embodiment of the method of managing connection status for a server device within a mobile radio communications device, it is preferable that the client/server status signal indicating the client/server pair is connected is a second client/server status signal generated subsequent to a first client/server status signal which indicates that the server is waiting for a connection.

In an exemplary embodiment of the method of managing connection status for a server device within a mobile radio communications device, it is preferable that, when the change in connection status is a change to a disconnected state, a client/server status signal is generated which indicates that the server is waiting for a connection.

In an exemplary embodiment of the method of managing connection status for a server device within a mobile radio communications device, it is preferable that when the change in connection status is a change to a disconnected state, a client/server status signal is generated which indicates that the client/server pair is disconnected.

In an exemplary embodiment of the mobile radio communications device for communicating with a network, it is preferable that the device further includes a server device.

In an exemplary embodiment of the mobile radio communications device for communicating with a network, it is preferable that the server device comprises a smartcard server device.

In an exemplary embodiment of the mobile radio communications device for communicating with a network, it is preferable that the client/server pair is a transport connection protocol client/server pair.

In an exemplary embodiment of the mobile radio communications device for communicating with a network, it is preferable that the managing device is configured for processing a received indication of a change of connection status for the local client/server pair to determine the nature of the change, and generating a corresponding client/server status signal in dependence on the determination.

In an exemplary embodiment of the mobile radio communications device for communicating with a network, it is preferable that the managing device is configured such that when the change in connection status is a change to a state in which the server is ready for a connection from a remote client, a client/server status signal is generated which indicates that the server is waiting for a connection.

In an exemplary embodiment of the mobile radio communications device for communicating with a network, it is preferable that the managing device is configured such that the client/server status signal indicating the server is waiting for a connection is generated prior to a remote client sending a request.

In an exemplary embodiment of the mobile radio communications device for communicating with a network, it is preferable that the managing device is configured such that when the change in connection status is a change to a connected state a client/server status signal is generated which indicates that the client/server pair is connected.

In an exemplary embodiment of the mobile radio communications device for communicating with a network, it is preferable that the managing device is configured such that the client/server status signal indicating the client/server pair is connected is generated after the remote client sends a request.

In an exemplary embodiment of the mobile radio communications device for communicating with a network, it is preferable that the managing device is configured such that the client/server status signal indicating the client/server pair is connected is a second client/server status signal generated subsequent to a first client/server status signal which indicates that the server is waiting for a connection.

In an exemplary embodiment of the mobile radio communications device for communicating with a network, it is preferable that the managing device is configured such that when the change in connection status is a change to a disconnected state, a client/server status signal is generated which indicates that the server is waiting for a connection.

In an exemplary embodiment of the mobile radio communications device for communicating with a network, it is preferable that the managing device is configured such that when the change in connection status is a change to a disconnected state, a client/server status signal is generated which indicates that the client/server pair is disconnected.

In an exemplary embodiment of the server device for use with a mobile radio communications device, it is preferable that the second device is configured to receive a client/server signal indicating that the client/server pair is disconnected and the fourth device is configured to maintain the channel on receipt of the client/server signal indicating client/server pair is disconnected.

In an exemplary embodiment of the server device for use with a mobile radio communications device, it is preferable that the second device is configured to receive a client/server signal indicating that the server is waiting for a connection and the fourth device is configured to maintain the channel on receipt of the client/server signal indicating the server is waiting for a connection.

In an exemplary embodiment of the server device for use with a mobile radio communications device, it is preferable that the second device is configured to receive a client/server signal indicating that the client/server pair is connected, and the server device comprises a fifth device for exchanging data over the channel after receipt of the client/server signal indicating the client/server pair is connected.

In an exemplary embodiment of the method performed in a server device for managing communication with a mobile radio communications device, it is preferable that the receiving step comprises receiving a client/server signal indicating that the client/server pair is disconnected and the channel maintaining step comprises maintaining the channel on receipt of the client/server signal indicating client/server pair is disconnected.

In an exemplary embodiment of the method performed in a server device for managing communication with a mobile radio communications device, it is preferable that the receiving step comprises receiving a client/server signal indicating that the server is waiting for a connection and the channel maintaining step comprises maintaining the channel on receipt of the client/server signal indicating the server is waiting for a connection.

In an exemplary embodiment of the method performed in a server device for managing communication with a mobile radio communications device, it is preferable that the receiving step comprises receiving a client/server signal indicating that the client/server pair is connected, and wherein the method further comprises exchanging data over the channel after receipt of the client/server signal indicating the client/server pair is connected.

The exemplary advantages obtained by the above-mentioned exemplary embodiments are described hereinbelow.

The present invention advantageously provides for a subscriber identification module (smartcard) device operating in server mode. This is advantageously achieved within the concept of the present invention through dividing the reporting between the bearer connection status and the transport connection status, i.e. the TCP connection. This provides particularly useful when a client of a subscriber identification module (smartcard) device comprises a remote client.

INDUSTRIAL APPLICABILITY

The present invention can be extended for use in relation to a variety of peripheral devices for use, for example, in relation to a handset such as a demotic device, memory cards in the form of a SD card or MMC cards, camera devices or indeed any peripheral device offering a server feature employing a mobile TCP/IP stack.

Likewise, the present invention can find employment in relation to any appropriate protocols used between such peripherals and handling delegation of TCP connections.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

This application is based upon and claims the benefit of priority from United Kingdom Patent Application No. 0519573.0 filed on Sep. 26, 2005, the entire disclosure of which, including specification, claims, drawings and summary, is incorporated herein by reference in its entirety.

The invention claimed is:

1. A method of managing connection status for a server device within a mobile radio communications device, the mobile radio communications device including a local client/server pair, the method including the steps of:

receiving an indication of a change of connection status for a local client/server pair when said change of connection status is a change to a state in which the server is listening for a connection from a remote client;

receiving an indication of a change of connection status for a local client/server pair when said change of connection status is a change to a state in which the client/server pair is disconnected; and receiving an indication of a change of connection status for a local client/server pair when said change of connection status is a change to a state in which the client is connected to the server; or receiving an indication of a change of network status;

processing the received indication to discriminate between said change of connection status and said change of network status;

generating, in response to said processing, a client/server status signal when a change of connection status for the local client/server pair occurs, the generated client/server status signal indicating that:

the server is listening for a connection from the remote client, when said change of connection status is a change to a state in which the server is listening for a connection from a remote client;

the client has reset the connection between the client/server pair, when said change of connection status is a change to a state in which the client/server pair is disconnected; and the client is connected to the server, when said change of connection status is a change to a state in which the client is connected to the server;

generating a different status signal when a change of network status occurs; and sending the generated client/server status signal and/or said different status signal to the server device.

2. The method as claimed in claim 1, wherein when an indication of a change of connection status for the local client/server pair is received, said processing step determines the nature of said change; and said generation step generates a corresponding client/server status signal in dependence on a result of said determination.

3. The method as claimed in claim 1, wherein the client/server status signal indicating the server is listening for a connection from the remote client is generated prior to the remote client sending a request.

4. The method as claimed in any previous claim, wherein a client/server status signal indicating the client/server pair is connected is generated after a remote client sends a request.

5. The method as claimed in claim 4, wherein said client/server status signal indicating the client/server pair is connected is generated subsequent to the client/server status signal indicating that the server is listening for a connection from a remote client.

6. A mobile radio communications device for communicating with a network, the device comprising: a local client/server pair; and a device for managing connection status of a server device for a channel between said server device and the local client/server pair;

wherein said managing device is configured for:

receiving an indication of a change of connection status for a local client/server pair when said change of connection status is a change to a state in which the server is listening for a connection from a remote client;

receiving an indication of a change of connection status for a local client/server pair when said change of connection status is a change to a state in which the client/server pair is disconnected; and receiving an indication of a change of connection status for a local client/server pair when said change of connection status is a change to a state in which the client is connected to the server; or receiving an indication of a change of network status;

processing the received indication to discriminate between said change of connection status and said change of network status;

generating, in response to said processing, a client/server status signal when a change of connection status for the local client/server pair occurs, the generated client/server status signal indicating that:

the server is listening for a connection from the remote client, when said change of connection status is a change to a state in which the server is listening for a connection from a remote client;

the client has reset the connection between the client/server pair, when said change of connection status is a change to a state in which the client/server pair is disconnected;

the client is connected to the server, when said change of connection status is a change to a state in which the client is connected to the server; and generating a different status signal when a change of network status occurs; and sending the generated client/server status signal and/or said different status signal to the server device.

7. The device as claimed in claim 6, further comprising a smartcard server device.

8. The device as claimed in claim 6, wherein said client/server pair is a transport connection protocol client/server pair.

9. The device as claimed in claim 6, wherein said managing device is configured for:

processing a received indication of a change of connection status for the local client/server pair to determine the nature of said change; and generating a corresponding client/server status signal in dependence on said determination.

10. The device as claimed in claim 9, wherein the managing device is configured such that the client/server status signal indicating the server is listening for a connection from the remote client is generated prior to a remote client sending a request.

11. The device as claimed in claim 9, wherein the managing device is configured such that a client/server status signal indicating the client/server pair is connected is generated after the remote client sends a request.

12. The device as claimed in claim 9, wherein the managing device is configured such that said client/server status signal indicating the client/server pair is connected is generated subsequent to the client/server status signal indicating that the server is listening for a connection from the remote client.

13. A server device for use with a mobile radio communications device, the server device comprising:

a first module for establishing a channel with a local client/server pair of the mobile radio communications device;

a second module for receiving a client/server status signal from the mobile radio communications device when a change of connection status for the local client/server pair occurs, the client/server status signal indicating that:

the server is listening for a connection from the remote client, when said change of connection status is a change to a state in which the server is listening for a connection from a remote client;

the client has reset the connection between the client/server pair, when said change of connection status is a change to a state in which the client/server pair is disconnected;

the client is connected to the server, when said change of connection status is a change to a state in which the client is connected to the server; and for receiving a different status signal from the mobile radio communications device when a change of network status occurs;

a third module for processing the received status signal to discriminate between said client/server status signal indicating that the server is listening for a connection from the remote client, said client/server status signal indicating that the client has reset the connection between the client/server pair, said client/server status signal indicating that client is connected to the server and said different status signal; and a fourth module for maintaining the channel when said client/server status signal is received, in dependence on the indication provided by the client/server status signal.

14. The device as claimed in claim 13, wherein said second module is configured to receive a subsequent client/server signal indicating that the client/server pair is connected; and said server device comprises a fifth module for exchanging data over said channel after receipt of said client/server signal indicating the client/server pair is connected.

15. A method performed in a server device for managing communication with a mobile radio communications device, the method including the steps of:

establishing a channel with a local client/server pair of the mobile radio communications device;

receiving a client/server status signal from the mobile radio communications device when a change of connection status for the local client/server pair occurs, the client/server status signal indicating that:

the server is listening for a connection from the remote client, when said change of connection status is a change to a state in which the server is listening for a connection from a remote client;

the client has reset the connection between the client/server pair, when said change of connection status is a change to a state in which the client/server pair is disconnected; and the client is connected to the server, when said change of connection status is a change to a state in which the client is connected to the server; or receiving a different status signal generated in response to a change in network status;

processing the received status signal to discriminate between said client/server status signal indicating that the server is listening for a connection from the remote client, said client/server status signal indicating that the client has reset the connection between the client/server pair, said client/server status signal indicating that client is connected to the server and said different status signal; and maintaining the channel when said processing indicates a client/server status signal is received, in dependence on the indication provided by the client/server status signal.

16. The method as claimed in claim 15, wherein said receiving step comprises receiving a subsequent client/server signal indicating that the client/server pair is connected; and wherein said method further comprises exchanging data over said channel after receipt of said client/server signal indicating that the client/server pair is connected.

* * * * *